United States Patent [19]

Tanaka

[11] 4,385,328
[45] May 24, 1983

[54] DATA EXTRACTING CIRCUIT
[75] Inventor: Masato Tanaka, Tokyo, Japan
[73] Assignee: Sony Corporation, Tokyo, Japan
[21] Appl. No.: 197,606
[22] Filed: Oct. 16, 1980
[30] Foreign Application Priority Data Oct. 26, 1979 [JP] Japan .................................. 54-138885
Dec. 7, 1979 [JP] Japan .................................. 54-159412

[51] Int. Cl.³ ............................................. G11B 5/09
[52] U.S. Cl. .......................................... 360/46; 360/67
[58] Field of Search ................. 360/46, 67, 40, 41, 360/42, 43

[56] References Cited
U.S. PATENT DOCUMENTS 3,516,066 6/1970 Jacoby ..................................... 360/42
3,597,751 8/1971 Heidecker et al. ..................... 360/43
3,603,945 9/1971 Hertrich ................................. 360/43

Primary Examiner—Vincent P. Canney

Attorney, Agent, or Firm—Hill, Van Santen, Steadman, Chiara & Simpson

[57] ABSTRACT

A data extracting circuit including an input terminal supplied with an input signal which is reproduced from a magnetic tape, positive and negative peak hold circuits connected to the input terminal, respectively, an adding circuit for adding the positive and negative peak voltages from the peak hold circuits at a predetermined rate and for producing a threshold voltage, and a level comparator having a first input terminal supplied with the delayed input signal and a second input terminal supplied with the threshold voltage and for deriving a digital binary data signal, the positive and negative peak hold circuits including a higher level priority circuit and a lower level priority circuit, respectively, and supplied with the input signal and a delayed signal which is further delayed by a second delay circuit following the delay circuit.

6 Claims, 9 Drawing Figures

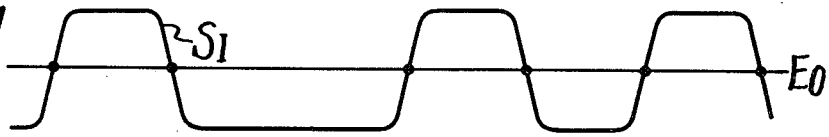
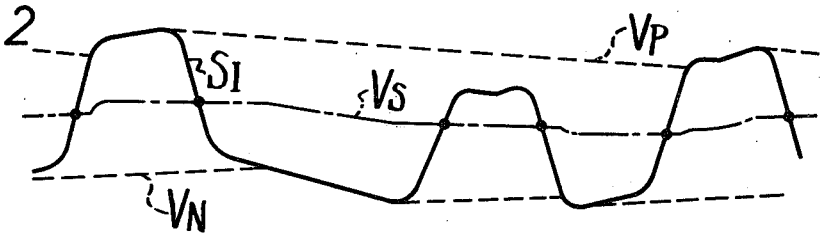
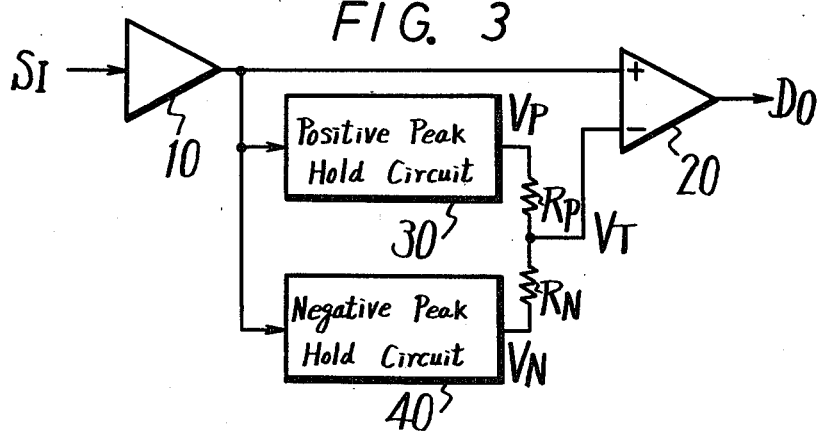
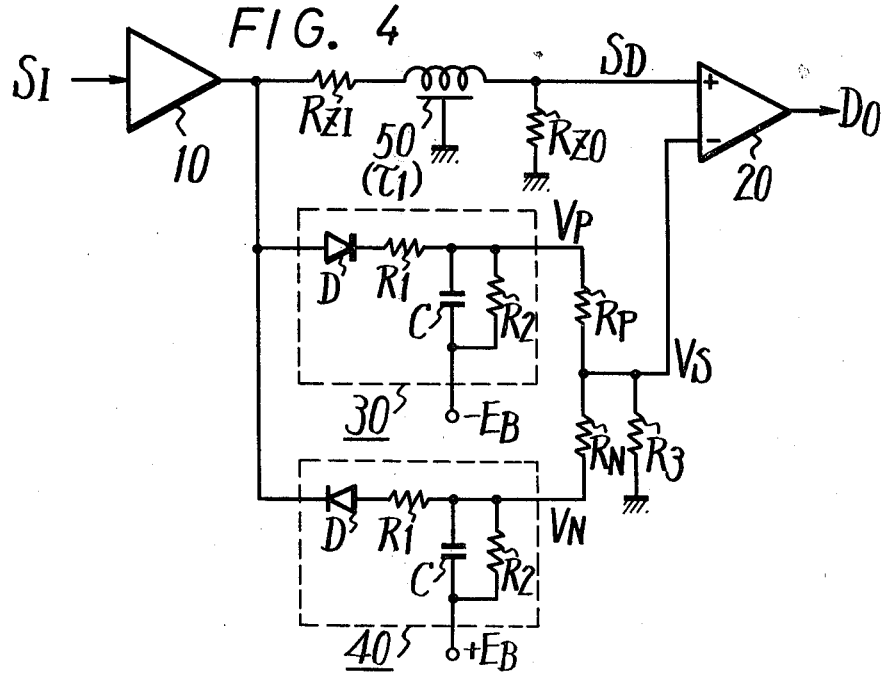

DATA EXTRACTING CIRCUIT

BACKGROUND OF THE INVENTION

1. Field of the Invention

The present invention relates generally to a data extracting circuit, and is directed more particularly to a data extracting circuit which extracts data of a binary digit signal or plural digit signals.

2. Description of the Prior Art

In general, when a binary digit input signal is constant in amplitude and is not bias-fluctuated, the data "1" and "0" of the input signal can be easily and correctly extracted by comparing the level of the input signal with a threshold voltage of a constant level.

However, in the case where the envelope of an input signal is varied by noise and so on, the data "1" and "0" of the input signal can not be extracted correctly by comparing the level of the input signal with the constant level threshold voltage.

Therefore, the following data extracting circuit may be considered. That is, in the data extracting circuit an input signal is applied to both a positive peak hold circuit and to a negative peak hold circuit to provide positive and negative peak-held voltages. The positive and negative peak-held voltages are added at the rate of 1:1 to provide a mean voltage thereof, and then the input signal is compared with the mean voltage which serves as a threshold voltage by a level comparator which delivers an output signal of the data "1" and "0" of the input signal or extracts the data "1" and "0" from the input signal.

According to the above data extracting circuit, when the varying frequency of the envelope of the input signal is sufficiently low as compared with the frequency of the input signal, the change point of the data of the input signal from "1" to "0" can be correctly detected without being affected by the envelope variation of the input signal. However, according to this data extracting circuit, the threshold voltage for detecting the data changing point from "1" to "0" of the input signal is also provided with the peak voltage of the input signal prior to the data changing point. Therefore, if noise with a frequency close to that of the input signal is contained therein and, the input is a signal reproduced from magnetic tape on which a signal was recorded with a prior recorded signal thereon which was not erased or signals are recorded, in a so-called superimposed manner, the varying frequency of the envelope of the input signal will be near the frequency of the input signal and, the input signal will drift between the peak point and the changing point and the threshold voltage will be shifted by that amount with the result that the change point can not be correctly detected.

OBJECTS AND SUMMARY OF THE INVENTION

Accordingly, an object of the present invention is to provide a novel data extracting circuit free from the defects inherent to the prior art data extracting circuit.

Another object of the invention is to provide a data extracting circuit by which the data of an input signal can be correctly and positively extracted even though the changing frequency of the envelope of the input signal is close to that of the input signal and in which the influence of the variation of the envelope can be cancelled.

A further object of the invention is to provide a data extracting circuit which can detect the edge of data of an input signal without being affected by the discharge in a peak hold circuit.

A yet further object of the invention is to provide a data extracting circuit, in which the discharge time constant of a peak hold circuit can be selected to be short and the follow-up characteristic of an input waveform is good so that accurate operations are conducted during peak hold.

According to an aspect of the present invention, a data extracting circuit is provided which comprises:
(a) an input terminal supplied with an input signal;
(b) a level comparator having first and second input terminals and an output terminal;
(c) a delay circuit connected between said input terminal and the first input terminal of said level comparator;
(d) a positive peak hold circuit and a negative peak hold circuit connected to said input terminal respectively; and
(e) an adding circuit connected between said positive and negative peak hold circuits and the second input terminal of said level comparator for adding the outputs of said positive and negative peak hold circuits at a predetermined rate.

The other objects, features and advantages of the present invention will become apparent from the following description taken in conjunction with the accompanying drawings through which the like references designate the same elements and parts.

BRIEF DESCRIPTION OF THE DRAWINGS

FIG. 1 is a waveform diagram showing an ideal input signal;

FIG. 2 is a waveform diagram showing a practical input signal;

FIG. 3 is a circuit diagram showing a prior art data extracting circuit;

FIG. 4 is a connection diagram showing an example of the data extracting circuit according to the present invention;

DESCRIPTION OF THE PREFERRED EMBODIMENTS

Figure 5:
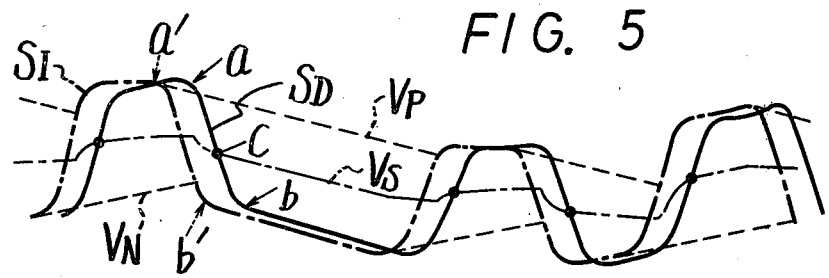
FIG. 5 is a waveform diagram to which reference will be made in explaining an operation of the example shown in FIG. 4.

For the case where a digital binary signal is recorded on a magnetic recording medium such as a magnetic tape, magnetic disc or magnetic card and an optical disc, it is desired ideally that an input signal $S_I$ shown in FIG. 1 be recorded and it will be reproduced with the same waveform as that of the recorded signal. In this case, by comparing the reproduced waveform with a constant threshold voltage $E_0$, binary digit values "1" and "0" can be extracted.

In general, however, due to noise and level fluctuations, the reproduced waveform is as shown in FIG. 2 at $S_I$. In this case, it may be considered that the data signals are extracted by a data extracting circuit such as shown in FIG. 3 from the reproduced signal $S_I$.

In the data extracting circuit shown in FIG. 3, the signal $S_I$ reproduced from a recording medium (not shown) is fed as an input signal through a buffer amplifier 10 to one of the input terminals of a level comparator circuit 20. The output from the buffer amplifier 10 is supplied to both a positive peak hold circuit 30 and to a negative peak hold circuit 40. A positive peak voltage $V_P$ derived from the positive peak hold circuit 30 and a negative peak voltage $V_N$ from the negative peak hold circuit 40 are respectively applied to both ends of series connected resistors $R_P$ and $R_N$. Thus, at the connection point between resistors $R_P$ and $R_N$ there is provided an added mean voltage $V_S$ which is then fed to the other input terminal of the level comparator 20 as a threshold voltage. At the level comparator 20, the threshold voltage $V_S$ is compared in level with the input signal $S_I$, and from the level comparator 20 there is derived an extracted binary signal $D_0$. In this case, however, since it is necessary that the time constant of the positive and negative peak hold circuits 30 and 40 for the peak hold to be large, if the changing frequency of the envelope of an input signal is close to that of the input signal such as the input signal $S_I$ shown in FIG. 2, the change cannot be sufficiently followed.

Turning to FIG. 4, an example of the data extracting circuit according to the present invention, which is free from the defect inherent to the prior art, will be described. In the example of the invention shown in FIG. 4 in which the references which are same as those of FIG. 3 designate the same elements and parts, the input signal $S_I$ passes through the buffer amplifier 10 and is fed through a resistor $R_{ZI}$ to a delay line 50 to form a delayed signal $S_D$ which appears across a resistor $R_{ZO}$ connected at the next stage of the delay line 50. The delay time $\tau_1$ of the delay line 50 is selected so that it is somewhat longer than a half of the rising-up or falling-down time of the input signal $S_I$ shown in FIG. 5. The delayed signal $S_D$ thus provided is applied to one input terminal of the level comparator 20.

The input signal $S_I$ through the buffer amplifier 10 is also supplied to both of positive and negative peak hold circuits 30 and 40. Each of these consists of a diode D, a resistor $R_1$, a capacitor C and a resistor $R_2$. In detail, the diode D and resistor $R_1$ of each circuit are connected in series, while the capacitor C and resistor $R_2$ are connected in parallel and the parallel combination is connected in series to the series connection of the diode D and resistor $R_1$. In this case, as will be apparent from FIG. 4, the diodes D are poled oppositely between the positive and negative peak hold circuits 30 and 40. Further, in each circuit, the resistor $R_2$ is selected to be sufficiently larger in resistance than the resistor $R_1$ so that the charging time constant of each of the positive and negative peak hold circuits 30 and 40 is determined by the capacitor C and resistor $R_1$ and also is selected to have a value such as not to be erroneously operated by noise, and the discharging time constant is determined by the capacitor C and resistor $R_2$ and is selected to be large. Further, for example, one connection point between the capacitor C and resistor $R_2$ of the positive peak hold circuit 30 is connected to a terminal to which a negative DC voltage $-E_B$ is applied, and one connection point between the capacitor C and resistor $R_2$ of the negative peak hold circuit 40 is connected to a terminal to which a positive DC voltage $+E_B$ is applied. Therefore, a positive peak-held voltage $V_P$ of the input signal $S_I$ is obtained at the connection point for the resistors $R_1$, $R_2$ and capacitor C of the positive peak hold circuit 30, and a negative peak-held voltage $V_N$ is obtained at the connection point for the resistors $R_1$, $R_2$ and capacitor C of the negative peak hold circuit 40, respectively.

The positive and negative peak-held voltages $V_P$ and $V_N$ thus obtained are applied to both ends of the series connected resistors $R_P$ and $R_N$, which form an adding circuit. In this case, the resistors $R_P$ and $R_N$ are selected to be equal in resistance so that at their connection point there is obtained a voltage $V_S$ which is the added voltage of the positive and negative peak-held voltages $V_P$ and $V_N$ with the rate of 1:1. Further, the resistance of resistors $R_P$ and $R_N$ is selected to be sufficiently large as compared to the resistance of resistor $R_2$ so as not to affect the operation of the peak hold circuits 30 and 40.

The added voltage $V_S$ thus obtained is applied as the threshold voltage to the other input terminal of the level comparator 20 and is therein compared in level with the input signal $S_I$ or delayed input signal $S_D$. Thus, as the output signal $D_0$ from the level comparator 20, there are obtained data "1" and "0" extracted from the input signal $S_I$.

As the level comparator 20, a circuit such as Schmitt trigger circuit with a hysteresis can be used. A resistor $R_3$ is connected to the connection point between the resistors $R_P$ and $R_N$ or to the other input terminal of level comparator 20 and serves to match the gain with the signal side and is selected to have a resistance of half of that of resistors $R_P$, $R_N$. In this case, the discharge time constant, determined by the capacitor C and resistor $R_2$, of each of the positive and negative peak hold circuits 30 and 40 is selected to be smaller than that of the example shown in FIG. 3, so that the follow-up property of variations of the envelope is improved.

According to the example of the invention shown in FIG. 4, as shown in FIG. 5, the threshold voltage $V_S$ used for extracting a point c of the delayed signal $S_D$ is provided from the peak-held values of input signal $S_I$ at points a' and b', so that signals equivalent to those provided from the delayed signal $S_D$ at points a and b immediately before and after the point c of the delayed signal $S_D$ are obtained. In other words, the threshold voltage $V_S$ for extracting the rising-up and falling-down points of the delayed signal $S_D$ is provided from the peaks equal to the points immediately before or after the rising-up or falling-down. Accordingly, even though the changing frequency of the envelope is close to the signal frequency as shown in FIG. 5, the mid point between the rising-up and falling-down points of the delayed signal $S_D$ can be exactly extracted.

Figure 6:
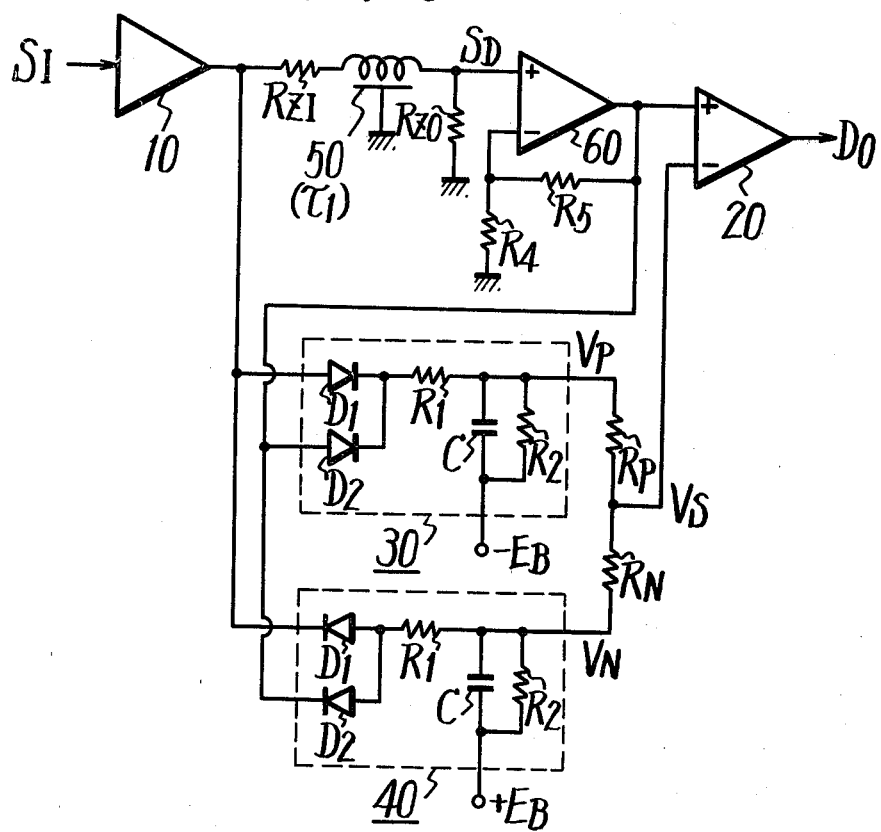
FIG. 6 is a connection diagram showing another example of the data extracting circuit of the invention.

Turning to FIG. 6, another example of the data extracting circuit according to the invention will be now described. In this example, the delayed signal $S_D$ obtained across the resistor $R_{ZO}$ is applied through another buffer amplifier 60 to one of the input terminals of the level comparator 20 and in each of the peak hold circuits 30 and 40, two diodes $D_1$ and $D_2$ are provided which are connected in parallel in place of the single diode $D_1$ provided in each of the peak hold circuits 30 and 40 shown in FIG. 4. The input signal $S_I$ passes through the buffer amplifier 10 and is applied to the diode $D_1$ of each of the positive and negative peak hold circuits 30 and 40, and the delayed signal $S_D$ passes through the buffer amplifier 60 and is applied to the diode $D_2$ of each of the peak hold circuits 30 and 40.

Thus, the diodes $D_1$ and $D_2$ of the positive peak hold circuit 30 form a high voltage priority or dominant circuit, so that from the peak hold circuit 30 there is obtained as the positive peak-held voltage $V_P$ a peak-held value of the higher of the input signal $S_I$ or the delayed signal $S_D$, while the diodes $D_1$ and $D_2$ of the negative peak hold circuit 40 form a low voltage priority or dominant circuit, so that from the negative peak hold circuit 40 there is obtained as the negative peak-held voltage $V_N$ a peak-held value of the lower of the input signal $S_I$ or the delayed signal $S_D$.

In the example of FIG. 6, the other input terminal of the buffer amplifier 60 is supplied with the output thereof through negative feedback resistors $R_4$ and $R_5$ which control its gain, so that the resistor $R_3$ used in the example of FIG. 4 becomes unnecessary.

Figure 7:
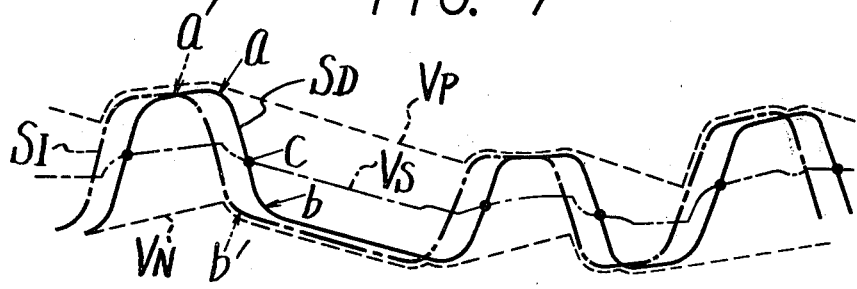
FIG. 7 is a waveform diagram to which reference will be made in the explanation of an operation of the example shown in FIG. 6.

According to the example of FIG. 4, the threshold voltage $V_S$ for extracting the point c of the delayed signal $S_D$ is provided from the peak-holding values at the points a' and b' of the input signal $S_I$ as shown in FIG. 5, while according to the example of the FIG. 6, the threshold voltage $V_S$ for extracting the point c of the delayed signal $S_D$ is provided from the peak-holding value of which one is higher between the value at point a' of the input signal and the value point a of the delayed signal $S_D$ and the value which is the lower between the value at point b' of the input signal $S_I$ and the value at point b of the delayed signal $S_D$ shown in FIG. 7. Therefore, according to the example in FIG. 6, the threshold value $V_S$ of the latter case becomes substantially equal to the mean value of the values at points a and b of the delayed signal $S_D$ which are immediately before and after the point c. Accordingly, even if the changing frequency of the envelope is close to the signal frequency as in the case of FIG. 7, the mid point between the rising-up and falling-down points of the delayed signal $S_D$ i.e. the edge of the data can be relatively accurately detected and also the influence due to discharge during the peak hold can be reduced by the time difference between the points a' and a.

The example of the invention shown in FIG. 6 can not avoid the error caused by the gradient in the discharge curve on the peak hold as will be apparent from the figures and hence can not accurately detect the edge of data.

Figure 8:
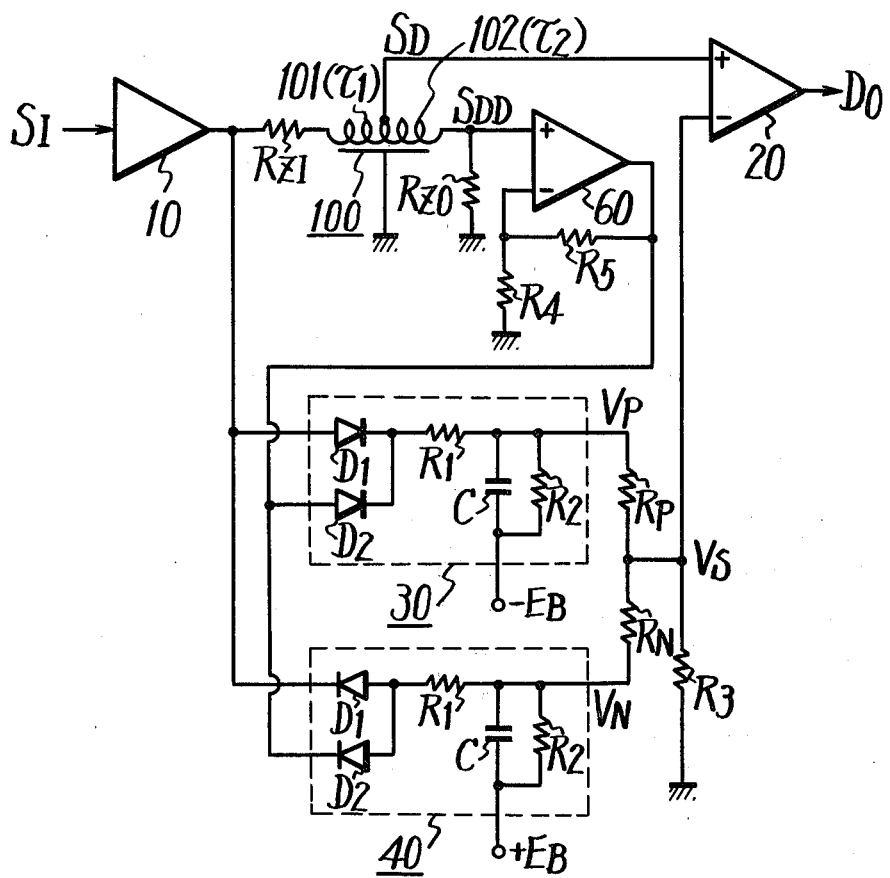
FIG. 8 is a connection diagram showing a further example of the data extracting circuit of the invention.

In order to improve the example shown in FIG. 6, an example shown in FIG. 8 is shown. In this example, the input signal $S_I$ passes through the buffer amplifier 10 and is applied to a delay line 100 in place of delay line 50 shown in the example of FIG. 6. In this example, a tap is provided on the delay line 100 to divide it into a first delay line member 101 and a second delay line member 102.

In this case, the delay time of the first delay line member 101 is selected to be the above-mentioned time $\tau_1$ which is somewhat larger than one half of the time from the rising-up of the input signal $S_I$ to its falling-down and the above delay signal $S_D$ is derived at the tap. The delayed signal $S_D$ thus derived is applied to one of the input terminals of the level comparator 20 as in the example of FIG. 4. While, the delay time of the second delay line member 102 is selected as $\tau_2$ which is a little smaller than one half of the time from the rising-up of the input signal $S_I$ to its falling-down, so that at the output side of the second delay line member 102 there is obtained a second delayed signal $S_{DD}$ which is delayed from the input signal $S_I$ by the time between the rising-up and falling-down points of the input signal $S_I$. This second delayed signal $S_{DD}$ is applied through the buffer amplifier 60 to the high voltage dominant positive peak hold circuit 30 and to the low voltage dominant positive peak hold circuit 40 in place of the first delayed signal $S_D$ in case of the example of FIG. 6. Therefore, from the positive peak hold circuit 30, there is obtained a positive peak-held voltage $V_P$ which is a higher voltage which is between the input signal $S_I$ and the second delayed signal $S_{DD}$ and its peak is positively held, while from the negative peak hold circuit 40, there is obtained a negative peak-held voltage $V_P$ which is a lower voltage which is between the input signal $S_I$ and the second delayed signal $S_{DD}$ and its peak is negatively held.

Figure 9:
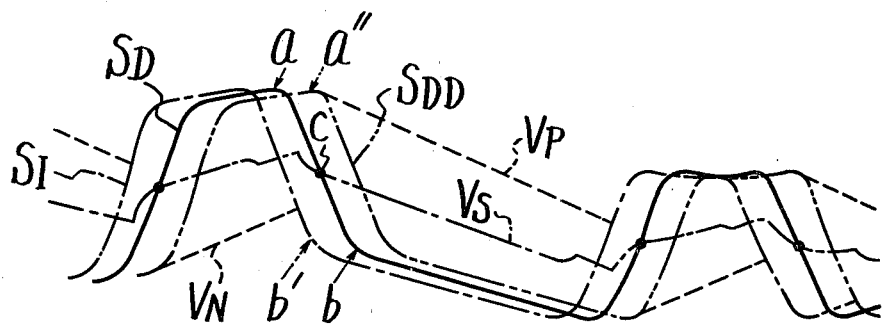
FIG. 9 is a waveform diagram to which reference will be made in the explanation of an operation of the example shown in FIG. 8.

According to the example of FIG. 8, as shown in FIG. 9, the threshold voltage $V_S$ for detecting the point c of the first delay signal $S_D$ is provided from the peak-held value at a point a'' of the second delayed signal $S_{DD}$ and the peak-held value at the point b' of the first input signal $S_I$, so that the above threshold voltage $V_S$ is exactly equal to the mean value of the values at points a and b of the first delayed signal $S_D$ immediately before and after point c. In other words, the threshold voltage for detecting the rising-up or falling-down point of the first delayed signal $S_D$ becomes equal to the mean values of the positive and negative peaks immediately before and after the rising-up and falling-down points. Therefore, the example of FIG. 8, the edge of the data can be detected accurately.

The above examples of the present invention are for cases where a binary signal is processed. However, the present invention can be applied to the case where a plural digit signal is processed with the same effects.

By way of example, a case for processing a ternary signal will be described. In this case, though not shown, two level comparators are provided and the positive and negative peak-held voltages are added at different rates to produce first and second added voltages. The delayed signal is level-compared by one of the level comparators with the first added voltage as a threshold voltage by which data representing whether or not it is the highest value is extracted, while the delayed signal is level-compared by the other level comparator with the second added voltage as a threshold voltage by which data representing whether or not it is the lowest value is extracted. Then, from both data the ternary data is detected.

In case of a signal with more than a quaternary digit, the present invention can be applied in a manner similar to the case for processing a ternary signal.

It will be apparent that many modifications and variations could be effected by one skilled in the art without departing from the scope of the novel concepts of the present invention so that the scope of the invention should be determined by the appended claims only.

I claim as my invention:

1. A data extracting circuit comprising:
   (a) an input terminal supplied with an input signal;
   (b) a level comparator having first and second input terminals and an output terminal;
   (c) a delay circuit connected between said input terminal and said first input terminal of said level comparator and having delay time shorter than the minimum transition period of said input signal;
   (d) a positive peak hold circuit and a negative peak hold circuit connected to said input terminal and having relatively small time constants respectively; and (e) an adding circuit connected between said positive and negative peak hold circuits and the second input terminal of said level comparator for adding the outputs of said positive and negative peak hold circuits at a predetermined rate which is supplied to the second input terminal of said level comparator as a threshold level.

2. A data extracting circuit according to claim 1, wherein said positive peak hold circuit includes a higher level priority circuit supplied with said input signal and the output of said delay circuit and outputs a higher peak voltage in said input signal and the output of said delay circuit, and said negative peak hold circuit includes a lower level priority circuit supplied with said input signal and the output of said delay circuit and outputs a lower peak voltage in said input signal and the output of said delay circuit.

3. A data extracting circuit according to claim 1 further comprising a second delay circuit connected between the output of said delay circuit and said positive and negative peak hold circuits.

4. A data extracting circuit according to claim 3, wherein the delay time of said second delay circuit is selected shorter than the delay time of said delay circuit connected with said input terminal.

5. A data extracting circuit comprising an input terminal receiving an input data signal, a delay means connected to said input terminal with a delay of one-half the rise and fall time of said input signal, a buffer amplifier receiving the output of said delay means, a level comparator receiving a first input from said buffer amplifier, a positive peak hold circuit with a pair of input positively poled diodes and one of said diodes connected to said input terminal and the other diodes connected to the output of said buffer amplifier, a negative peak hold circuit with a pair of input negatively poled diodes and one of said diodes connected to said input terminal and the other diode connected to the output of said buffer amplifier, and an adding circuit connected to the outputs of said positive and negative peak hold circuits and supplying a second input to said level comparator and said positive and negative peak hold circuits have relatively small time constants.

6. A data extracting circuit comprising an input terminal receiving an input data signal, a first delay means connected to said input terminal with a delay a little larger than one-half the rise and fall time of said input signal, a second delay means receiving an output of said first delay means and having a delay a little smaller than one-half the rise or fall times of the input signal, a level comparator receiving a first input from said first delay means, a buffer amplifier receiving an input from said second delay means, a positive peak hold circuit with a pair of input positively poled diodes and one of said diodes connected to said input terminal and the other diodes connected to the output of said buffer amplifier, a negative peak hold circuit with a pair of input negatively poled diodes and one of said diodes connected to said input terminal and the other diode connected to the output of said buffer amplifier, and an adding circuit connected to the outputs of said positive and negative peak hold circuits and supplying a second input to said level comparator and said positive and negative peak hold circuits have relatively small time constants.

* * * * *

UNITED STATES PATENT AND TRADEMARK OFFICE
CERTIFICATE OF CORRECTION

PATENT NO. : 4,385,328
DATED : May 24, 1983
INVENTOR(S) : Masato Tanaka

It is certified that error appears in the above—identified patent and that said Letters Patent is hereby corrected as shown below:

Column 3, line 18, change "$V_S$" to --$V_T$--.

$\mathfrak{Signed\ and\ Sealed\ this}$

*Twentieth* $\mathfrak{Day\ of}$ *December 1983*

[SEAL]

*Attest:*

GERALD J. MOSSINGHOFF

*Attesting Officer*     *Commissioner of Patents and Trademarks*